United States Patent
Boufounos et al.

(10) Patent No.: US 10,145,576 B2
(45) Date of Patent: Dec. 4, 2018

(54) SYSTEM AND METHOD FOR CONTROLLING OPERATIONS OF AIR-CONDITIONING SYSTEM

(71) Applicant: Mitsubishi Electric Research Laboratories, Inc., Cambridge, MA (US)

(72) Inventors: Petros T. Boufounos, Arlington, MA (US); Piyush Grover, Providence, RI (US); Boris Kramer, Blacksburg, VA (US); Mouhacine Benosman, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 695 days.

(21) Appl. No.: 14/714,428

(22) Filed: May 18, 2015

(65) Prior Publication Data

US 2016/0258645 A1 Sep. 8, 2016

Related U.S. Application Data

(63) Continuation-in-part of application No. 14/640,052, filed on Mar. 6, 2015.

(51) Int. Cl.
*F24F 11/00* (2018.01)
*G05B 17/02* (2006.01)
(Continued)

(52) U.S. Cl.
CPC .......... *F24F 11/006* (2013.01); *F24F 11/30* (2018.01); *F24F 11/62* (2018.01); *G05B 13/04* (2013.01);
(Continued)

(58) Field of Classification Search
CPC .......... F24F 11/006; F24F 11/30; F24F 11/46; F24F 11/62; F24F 11/65; F24F 2110/00; G05B 13/04; G05B 17/02; G05D 23/1917
See application file for complete search history.

(56) References Cited

U.S. PATENT DOCUMENTS

| | | | | |
|---|---|---|---|---|
| 6,829,522 B1 * | 12/2004 | Filev | ......................... | G01P 5/02 454/50 |
| 7,016,779 B2 * | 3/2006 | Bowyer | .............. | F02D 41/0007 701/108 |

(Continued)

FOREIGN PATENT DOCUMENTS

| | | |
|---|---|---|
| EP | 2620836 A1 | 7/2013 |
| WO | 2012019022 A2 | 9/2012 |

OTHER PUBLICATIONS

Brunton et al. Compressive sensing and low rank libraries for classigication of bifurcation regimes in nonlinear dynamical systems. Dec. 14, 2013. XP055276792.
(Continued)

*Primary Examiner* — Abdelmoniem I Elamin
(74) *Attorney, Agent, or Firm* — Gene Vinokur; James McAleenan; Hironori Tsukamoto

(57) ABSTRACT

A method determines values of the airflow measured in the conditioned environment during the operation of the air-conditioning system and selects, from a set of regimes predetermined for the conditioned environment, a regime of the airflow matching the measured values of the airflow. The method selects, from a set of models of the airflow predetermined for the conditioned environment, a model of airflow corresponding to the selected regime and models the airflow using the selected model. The operation of the air-conditioning system is controlled using the modeled airflow.

20 Claims, 13 Drawing Sheets

(51) Int. Cl.
  *G05D 23/19* (2006.01)
  *G05B 13/04* (2006.01)
  *F24F 11/30* (2018.01)
  *F24F 11/62* (2018.01)
  *F24F 110/00* (2018.01)
  *F24F 11/65* (2018.01)
  *F24F 11/46* (2018.01)

(52) U.S. Cl.
  CPC ......... *G05B 17/02* (2013.01); *G05D 23/1917* (2013.01); *F24F 11/46* (2018.01); *F24F 11/65* (2018.01); *F24F 2110/00* (2018.01)

(56) References Cited

U.S. PATENT DOCUMENTS

| | | | | |
|---|---|---|---|---|
| 8,825,451 | B2* | 9/2014 | VanGilder | G06F 17/5009 |
| | | | | 703/1 |
| 2008/0195564 | A1* | 8/2008 | Kojima | B60H 1/00735 |
| | | | | 706/12 |
| 2011/0040392 | A1 | 2/2011 | Hamann et al. | |
| 2012/0143516 | A1 | 6/2012 | Mezic et al. | |
| 2012/0197444 | A1 | 8/2012 | Wang et al. | |
| 2013/0006426 | A1* | 1/2013 | Healey | H05K 7/20836 |
| | | | | 700/278 |
| 2013/0204402 | A1 | 8/2013 | Mezic et al. | |
| 2014/0371917 | A1* | 12/2014 | Rite | F24F 11/001 |
| | | | | 700/276 |
| 2015/0192316 | A1* | 7/2015 | Zhou | H05K 7/20836 |
| | | | | 700/276 |
| 2016/0040904 | A1* | 2/2016 | Zhou | F24F 13/18 |
| | | | | 700/276 |
| 2016/0281723 | A1* | 9/2016 | Zhang | H02P 6/28 |

OTHER PUBLICATIONS

Proctor et al. Exploiting sparsity and equation free architectures in complex systems, European Physical journal, special topics. Springer, DE, FR, vol. 223, No. 13. Dec. 10, 2014. pp. 2665-2684.

Ahuja et al. Reduced order models for control of stratified flows in buildings, 2011 American Control Conference, ACC 2011. San Francisco, CA Jun. 29, 2011-Jul. 1, 2011. IEEE pp. 2083-2088.

Kalashnikova et al. Stabilization of projection based reduced order models for linear time invariant systems via optimization based eigenvalue reassignment. Computer methods in applied mechanics and engineering, North Holland, Amsterdam, NL. vol. 272, Jan. 18, 2014. pp. 251-270.

Procter et al., "Exploiting Sparsity and Equation Free Architectures in Complex Systems," The European Physical Journal Special Topics, France Dec. 10, 2014, vol. 223, No. 13, p. 2665-2684.

Ahuja et al., "Reduced Order Models for Control of Stratified Flows in Buildings," Jul. 1, 2011. American Control Congerence (ACC 2011).

* cited by examiner

SYSTEM AND METHOD FOR CONTROLLING OPERATIONS OF AIR-CONDITIONING SYSTEM

RELATED APPLICATION

This U.S. Non-Provisional Patent Application is a Continuation-in-Part of U.S. patent application Ser. No. 14/640,052, "System and Method for Controlling Operations of Air-Conditioning System," filed by Benosman et al., on Mar. 6, 2015, now U.S. Pat. No. 9,976,765.

FIELD OF THE INVENTION

This invention relates generally to air-conditioning systems, and more particularly to controlling operations of the air-conditioning system.

BACKGROUND OF THE INVENTION

Air-conditioning systems, such as heating, ventilating and air conditioning (HVAC) system, are widely used in industrial and residential applications. For example, the air-conditioning system can include one or a combination of variable speed compressors, variable position valves, and variable speed fans to the vapor compression cycle to deliver particular amount of heat. The command inputs to the vapor compression system that delivers that particular amount of heat are often not unique and the various combinations of components consume different amounts of energy. Therefore, it is desirable to operate the vapor compression system using the combination of inputs that minimizes energy and thereby maximizes efficiency.

Conventionally, methods maximizing the energy efficiency rely on the use of mathematical models of the physics of air-conditioning systems. Those model-based methods attempt to describe the influence of commanded inputs of the components of the vapor compression system on the thermodynamic behavior of the system and the consumed energy. In those methods, models are used to predict the combination of inputs that meets the heat load requirements and minimizes energy.

However, the air-conditioning systems are known to vary over time. A model that accurately describes the operation of a vapor compression system at one point in time may not be accurate at a later time as the system changes, for example, due to slowly leaking refrigerant or the accumulation of corrosion on the heat exchangers.

In addition, the models of the air-conditioning system often ignore installation-specific characteristics such as room size, causing the model of the air-conditioning system to deviate from operation of the system. For example, the knowledge of the airflow produced during an operation of air-conditioning system can be used to optimize the operation of the system. However, the physical model of the airflow is of infinite dimension and too complex to be used in real time control applications. In addition, the model of the airflow can also change during the operation of the air-conditioning system.

Accordingly, there is a need for a system and a method for controlling air-conditioning system using real time knowledge of the airflow produced during the operation of the system.

SUMMARY OF THE INVENTION

It is an object of present invention to provide a system and a method for controlling an operation of an air-conditioning system such that heat load requirements of the operation are met, and a performance of the system is optimized. It is a further object of the invention to provide such a system and a method that use a model of the fluid, e.g., the airflow in the controlled environment or flow of refrigerant in the pipes of the air-conditioning system, in controlling the air-conditioning system. It is a further object of the invention to provide such a system and a method that optimizes the performance of the air-conditioning system over time during the operation of the air-conditioning system.

Some embodiments of the invention address a problem of determining and updating the model of the fluid dynamics, such that the model accurately represent the dynamics of the fluid and is able to adapt to the changes in the conditioned environment. Accordingly, some embodiments use the model of low dimension suitable for real time update and control. For example, in some embodiments the model includes a reduced order model (ROM) having a number of parameters less than a physical model of the fluid dynamics according to a Boussinesq equation, wherein the Boussinesq equation is a partial differential equation (PDE), and wherein the reduced order model is an ordinary differential equation (ODE).

To that end, some embodiments address a model reduction problem to reduce a complex model of, e.g., an infinite dimension to a simpler model of a lesser dimension, e.g., a finite dimension. In this context, the model reduction problem means determining all parameters or coefficients of the simpler model such that an error between performance measurements of the system according to the complex model and the system according to the simpler model is minimized. For example, in air flow modeling estimation and control applications, there is a need to transform the PDE models representing the air flow with ODE models that have lesser dimension and complexity. Such reduction can allow a real-time control of the air flow systems, such as air conditioning systems.

Some embodiments of the invention are based on a recognition that the operation of the air-conditioning system under different conditions can result in different regimes of the fluid dynamics. In the controlled environments considered herein, the geometry, boundary conditions and external disturbances can change over time. Therefore, the control of the air-conditioning system in such environments has to adapt to those changes during runtime.

For example, if the room doors and windows are closed, the airflow inside of the room has certain flow patterns, and dynamics; if one of the windows is opened, then the airflow has different flow patterns and dynamics. A collection of one or more operating conditions yielding similar flow patterns and dynamics is referred herein as a regime. Some embodiments of the invention are based on recognition that the low dimensional models with lower complexity can be derived using various low dimensional techniques, such as Galerkin projection. This projection results in the same ROM for all regimes of the fluid dynamics, which is suboptimal.

Accordingly, some embodiments determine the regime of the fluid dynamic at a given time during the operation and select a model of the fluid dynamic for that regime. Such a selection is advantageous, because different regimes can be represented with different ROM and/or corresponding parameters of the ROM.

Some embodiments of the invention are based on recognition that the regimes of the airflow can be represented by the dominant structures and their time evolution, i.e. fluid dynamics. Such structures can be determined by various feature extraction techniques, such as proper orthogonal decomposition (POD) or dynamic mode decomposition (DMD) and can serve as identifiers for the regimes.

The dominant structures of the airflow indicate constraints on the movement of the air and its temperature distribution in the controlled environment. These constraints therefore define a pattern of the movement of the air that satisfies the constraints. To that end, the dominant structures of the airflow are analogous to currents in the ocean where different forces can generate a continuous, directed movement of seawater. Similar to the currents in the ocean forming identifiable patterns, the dominant structures corresponding to a regime form a pattern in the controlled environment that can serve as a fingerprint identity of the regime.

Some embodiments are based on realization that if only the dominant structures are used to represent the airflow, such a representation makes the airflow sparse in the among possible flow patterns in the controlled environment. These recognitions lead to a realization that the combination of the sparsity of the signal representing dominant structures of the airflow and limited range of possible values of the dominant structures of the airflow enable reconstruction of the dominant structures of the actual airflow using various compressive sensing techniques, which are used to recover a signal sampled at a sampling rate below its Nyquist sampling rate.

Some embodiments are based on additional realization that the airflow velocity and temperature field can be defined as value of 3D velocity vector and 1D temperature vector at discrete points in the controlled environment. At any time, airflow velocity and temperature field can be described as combination of temperature and velocities of the dominating structures of airflow. The strength of these dominant structures, measured by some norm, is not usually static in time. Information about the time evolution, i.e. the dynamics, of the dominant structures can also be used to form addition constraints during the regime selection process reducing the dependency to sensor noise.

In addition, some embodiments of the invention are based on a realization that the problem of representing a complex model of a system with a simpler model of the system can be transformed into a virtual control problem of controlling the system of the simpler model to track a reference trajectory of the performance measurements determined using the complex model of the system. In this virtual control problem, the control inputs include the coefficients of the simpler model, and the output of the virtual control is performance measurement determined for the system according to the simpler model with input coefficients. The solution to the virtual control problem is the control inputs, i.e., the coefficients of the simpler model, reducing a cost function representing the tracking error. This realization allows using control theory methods to virtually control the virtual control problem to determine the coefficients of the selected ROM.

Accordingly, one embodiment discloses a method for controlling an operation of an air-conditioning system generating airflow in a conditioned environment, including determining values of the airflow measured in the conditioned environment during the operation of the air-conditioning system; selecting, from a set of regimes predetermined for the conditioned environment, a regime of the airflow matching the measured values of the airflow; selecting, from a set of models of the airflow predetermined for the conditioned environment, a model of airflow corresponding to the selected regime; modeling the airflow using the selected model; and controlling the operation of the air-conditioning system using the modeled airflow. The steps of the method are performed using at least one processor of a controller.

Another embodiment discloses a system for controlling an air-conditioning system generating a flow of fluid in a conditioned environment including a set of sensors for measuring values of the flow in the conditioned environment; a memory storing a set of regimes of fluid dynamic in the conditioned environment and a corresponding set of models of flow dynamics connecting values of velocity and temperature of fluid conditioned during the operation of the system; and a controller for controlling the operation of the system based on a modeled flow, wherein the controller includes a processor for selecting a regime matching the measured values of the flow, for selecting a model corresponding to the selected regime, and for determining the modeled flow using the selected model.

Yet another embodiment discloses an air-conditioning system, including a user input interface for receiving a setpoint; a set of sensors for measuring values of airflow in the conditioned environment; an evaporator having a fan for adjusting an airflow rate through a heat exchanger; a condenser having a fan for adjusting the airflow rate through the heat exchanger; a compressor having a speed for compressing and pumping refrigerant through the system; an expansion valve for providing an adjustable pressure drop between a high-pressure portion and a low-pressure portion of the vapor compression system; a memory storing a set of regimes of fluid dynamic in the conditioned environment and a corresponding set of models of flow dynamics connecting values of velocity and temperature of the airflow conditioned during the operation of the system; and a controller for controlling the operation based on a modeled airflow to achieve the setpoint, wherein the controller includes a processor for selecting a regime matching the measured values of the airflow, for selecting a model corresponding to the selected regime, and for determining the modeled flow using the selected model.

Definitions

In describing embodiments of the invention, the following definitions are applicable throughout (including above).

A "control system" or a "controller" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

An "air-conditioning system" or a heating, ventilating, and air-conditioning (HVAC) system refers to a system that uses the vapor compression cycle to move refrigerant through components of the system based on principles of thermodynamics, fluid mechanics, and/or heat transfer. The air-conditioning systems span a very broad set of systems, ranging from systems which supply only outdoor air to the occupants of a building, to systems which only control the temperature of a building, to systems which control the temperature and humidity.

"Components of an air-conditioning system" refer to any components of the system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the air-conditioning system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in the air-conditioning system.

"Set of control signals" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "set-point" refers to a target value the system, such as the air-conditioning system, aim to reach and maintain as a result of the operation. The term setpoint is applied to any particular value of a specific set of control signals and thermodynamic and environmental parameters.

A "central processing unit (CPU)" or a "processor" refers to a computer or a component of a computer that reads and executes software instructions.

A "module" or a "unit" refers to a basic component in a computer that performs a task or part of a task. It can be implemented by either software or hardware.

DETAILED DESCRIPTION OF EMBODIMENTS OF THE INVENTION

Figure 1A:
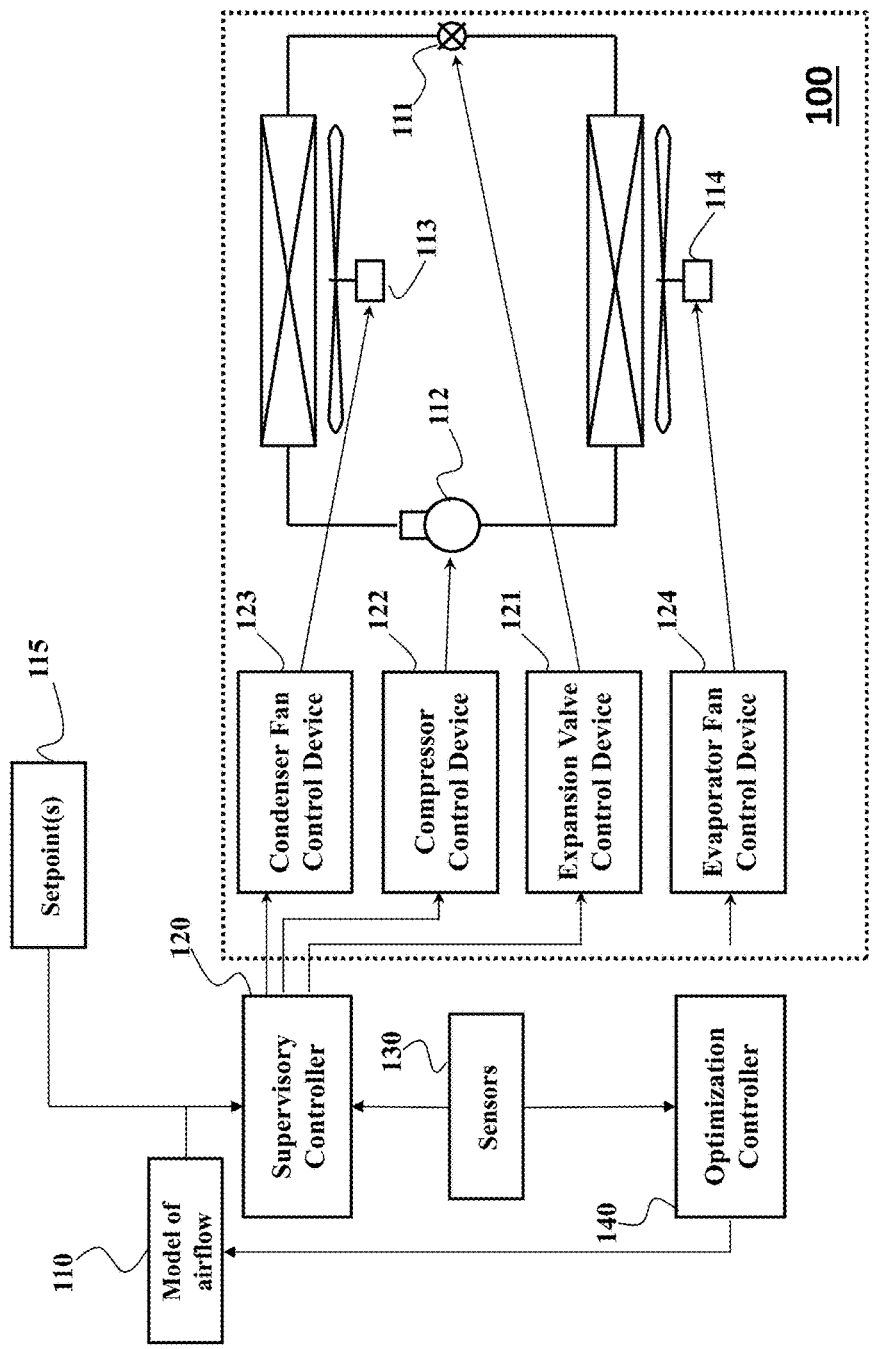
FIG. 1A is a block diagram of an air-conditioning system according to one embodiment of the invention.

FIG. 1A shows a block diagram of an air-conditioning system 100 according to one embodiment of the invention. The system 100 can include one or a combination of components such an evaporator fan 114, a condenser fan 113, an expansion valve 111, and a compressor 112. The system can be controlled by a controller 120 responsible for accepting set-points 115, e.g., from a thermostat, and readings of a sensor 130, and outputting a set of control signals for controlling operation of the components. A supervisory controller 120 is operatively connected to a set of control devices for transforming the set of control signals into a set of specific control inputs for corresponding components. For example, the supervisory controller is connected to a compressor control device 122, to an expansion valve control device 121, to an evaporator fan control device 124, and to a condenser fan control device 123.

The supervisory controller is operatively connected to a model of the airflow dynamics 110 connecting values of flow and temperature of air conditioned during the operation of the air-conditioning system. In this manner, the supervisory controller controls operation of the air-conditioning system such that the set-point values are achieved for a given heat load. For example, the supervisory controller determines and/or updates at least one control input for at least one component of the air-conditioning system to optimize a metric of performance determines using the model. Other configurations of the system 100 are possible.

The system 100 is also controlled by an optimization controller 140 for updating parameters of the model of the airflow dynamics. In some embodiments, the optimization controller 140 updates the model 140 iteratively, e.g., for each or some steps of control, to reduce an error between values of the airflow determined according to the model and values of the airflow measured by the sensors 130 during the operation of the system 100.

In various embodiments the supervisory and optimization controller are implemented as a single or separate systems and generally referred herein as a controller. The controller can include a memory storing the model 110, and a processor for controlling the operation of the system 100 and for updating the model during the operation.

In some embodiments of the invention, one of the objectives of the controller is to optimize the performance of the system measured in accordance with a metric of performance. Examples of the metric include, but are not limited to, an energy consumed by the system during the operation, and efficiency of the system.

Figure 1B:
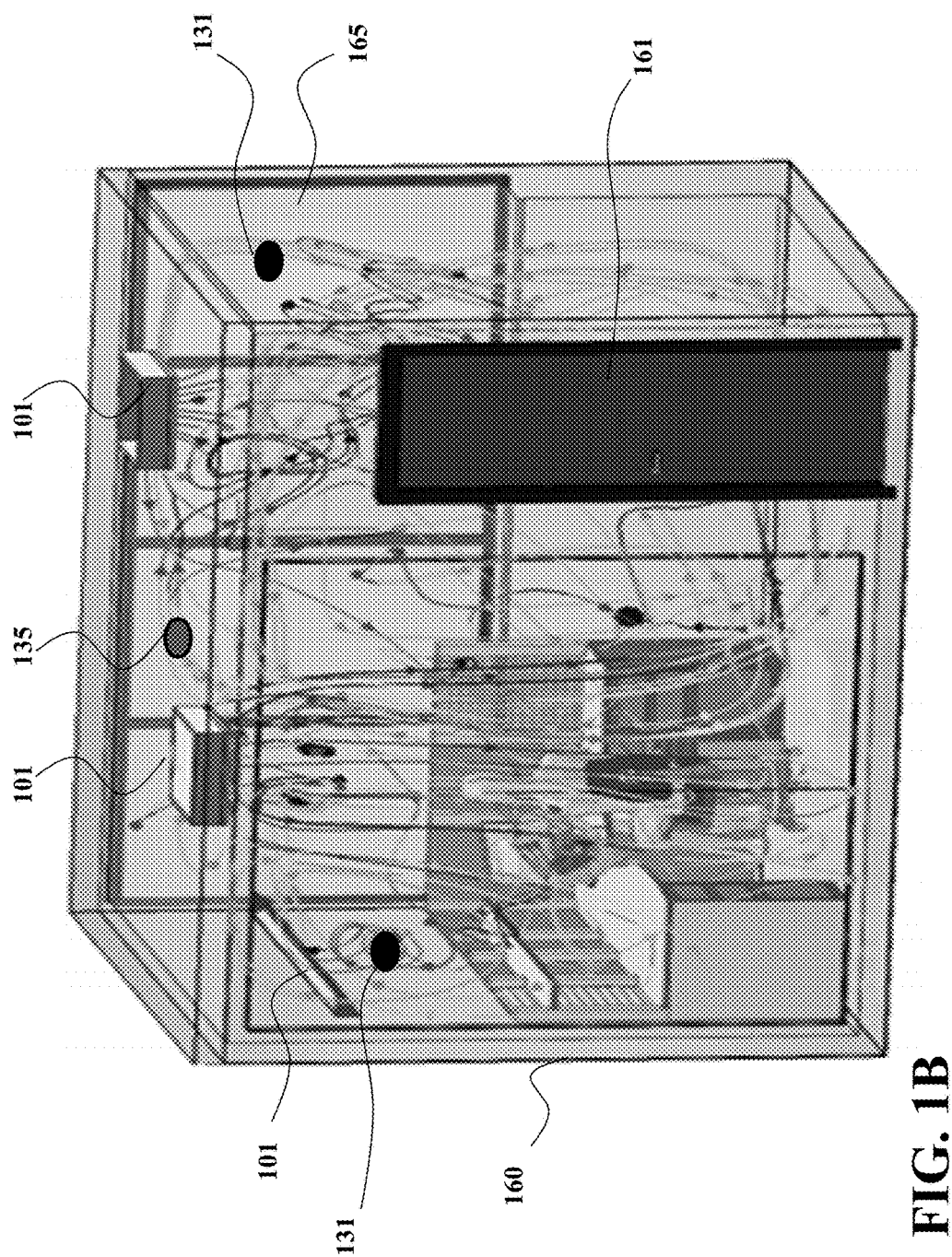
FIG. 1B is a schematic of an example of air-conditioning a room according to some embodiments of the invention.

FIG. 1B shows a schematic of an example of air-conditioning a room 160 according to some embodiments of the invention. In this example, the room 160 has a door 161 and at least one window 165. The temperature and airflow of the room is controlled by the air-conditioning system, such as the system 100 through ventilation units 101. A set of sensors 130 is arranged in the room, such as at least one airflow sensor 131 for measuring velocity of the air flow at a given point in the room, and at least one temperature sensor 135 for measuring the room temperature. Other type of setting can be considered, for example a room with multiple HVAC units, or a house with multiple rooms.

Figure 1C:
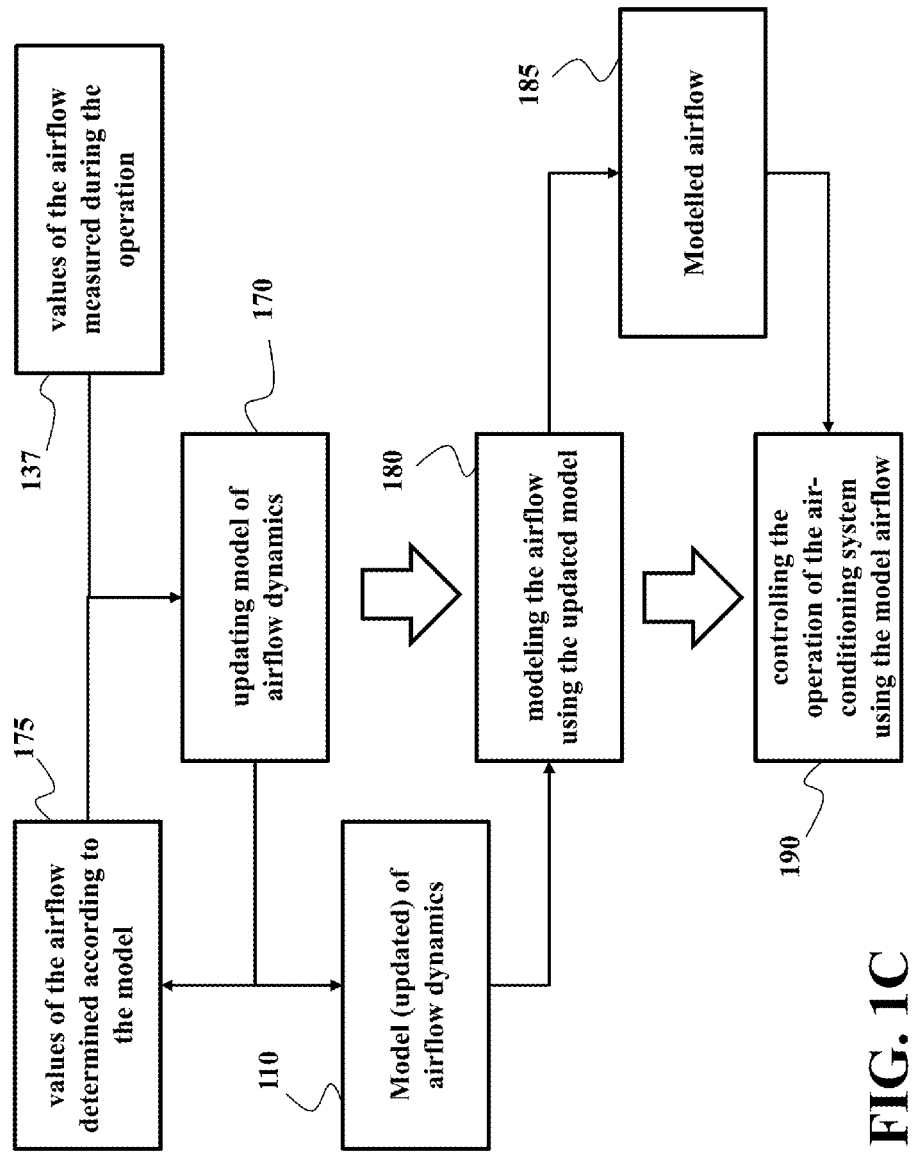
FIG. 1C is a block diagram of a method for controlling an operation of an air-conditioning system generating airflow in a conditioned environment according to some embodiments of the invention.

FIG. 1C shows a block diagram of a method for controlling an operation of an air-conditioning system generating air flow in a conditioned environment according to some embodiments of the invention. Steps of the method are performed using at least one processor of the controller.

The method updates 170 a model 110 of airflow dynamics connecting values of flow and temperature of air conditioner during the operation of the air-conditioning system. In various embodiments, the updating step 170 iteratively reduces an error between values 175 of the airflow determined according to the model 110 and values 137 of the airflow measured during the operation, e.g., by the sensor 130.

Next, the updated model 110 is used for modeling 180 the airflow 185, and the operation of the air-conditioning system is controlled 190 using the model airflow 185. Due to iterative nature of the update, the model 110 used to determine the values 175 has been previously updated 170 during the previous iteration and the model 110 used to determine the modeled airflow 185 is updated during the current iteration.

Figure 1D:
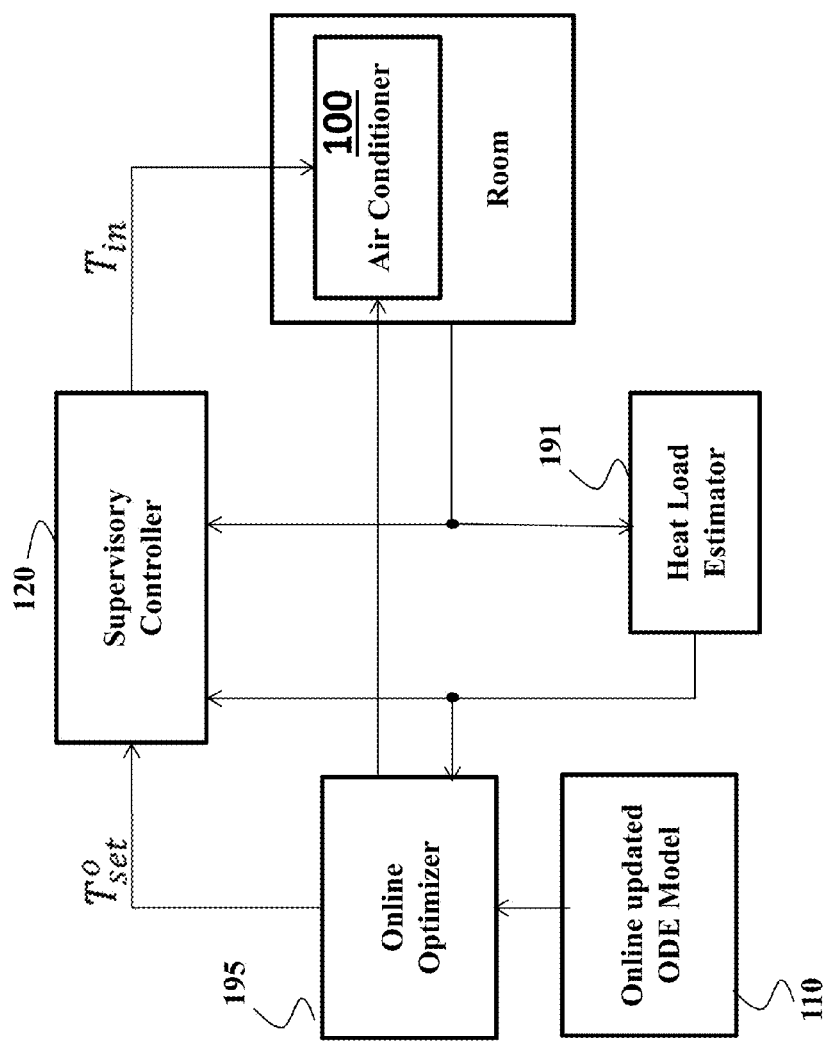
FIG. 1D is a block diagram of the method for controlling one or combination of a vent angle and a room inlet air temperature according to one embodiment of the invention.

FIG. 1D shows a block diagram of a method for controlling one or combination of a vent angle and room inlet air temperature of the air-conditioning system to maintain set point at certain location in the room according to one embodiment of the invention. The online optimizer 195 obtains heat load estimate from the estimator 191, and determines the vent angle using the updated model 110. The vent angle optimizes the air flow, which in turn can reduce the setpoint and optimize the efficiency of the air-conditioning system. For example, the online optimizer 195 can output a modified set point to the controller 190 and can output a vent angle to the system 100. The supervisory controller 120 operates the system 100 at determined inlet temperature to achieve set-point at the given location.

Some embodiments of the invention address a problem of determining and updating the model of the airflow dynamics, such that the model accurately represent the dynamics of the airflow and is able to adapt to the changes in the conditioned environment, such as a room 160 caused by, e.g. opening and closing of a window or a door. Accordingly, some embodiments use the model of low dimension suitable for real time update and control. For example, in some embodiments the model includes a reduced order model having a number of parameters less than a physical model of the airflow according to a Boussinesq equation, wherein the Boussinesq equation is a partial differential equation (PDE), and wherein the reduced order model is an ordinary differential equation (ODE).

To that end, some embodiments address a model reduction problem aim to reduce a complex model of, e.g., an infinite dimension to a simpler model of a lesser dimension, e.g., a finite dimension. In this context, the model reduction problem determines all parameters or coefficients of the simpler model such that an error between performance measurements of the system according to the complex model and the system according to the simpler model is minimized. For example, in air flow modeling estimation and control applications, there is a need to transform the PDE models representing the air flow with ODE models that have lesser dimension and complexity. Such reduction can allow a real-time control of the air flow systems, such as air conditioning systems.

For example, according to the principles of physics, the physical model of the airflow dynamics can be modeled with PDEs also called Boussinesq equations. The Boussinesq equations are difficult to solve in closed-from (nonlinear) and computationally expensive to solve numerically, because their exact solution lies in an infinite dimensional space, but includes all the frequencies or modes of the airflow dynamic.

The Boussinesq equations are given by:

$$\vec{u}_t = \mu \Delta \vec{u} - (\vec{u} \cdot \nabla)\vec{u} - \nabla p - T$$

$$\nabla \cdot \vec{u} = 0$$

$$T_t = k\Delta T - u \cdot \nabla T.$$

In this equation, T is a temperature scalar variable and $\vec{u}$ is a velocity vector in three dimensions. Here, $\mu$ is a viscosity and the reciprocal of the Reynolds number, k is the heat diffusion coefficient, and p represents the pressure scalar variable.

The operator $\Delta$ and $\nabla$ are defined as:

$$\Delta = \nabla^2$$

$$\nabla = \left(\frac{\delta}{\delta x}, \frac{\delta}{\delta y}, \frac{\delta}{\delta z}\right)^T.$$

The Boussinesq equation describes the coupling between the airflow and the temperature in the room but is of infinite dimensions. In addition, the Boussinesq equation has uncertain conditions where the boundary conditions of the PDE are changing over time or the case where one of the coefficients involved in the PDE are changing. These mathematical changes actually reflect some real changes in the room. For example, an opening and closing of a window or a door in the room changes the boundary conditions of the Boussinesq PDE. Similarly, weather changes, such as daily and seasonal changes, affect the difference between the temperature in the room and outside of the room, which in turn affect some of the PDE coefficients, e.g. Reynold's number can be affected.

In all these scenarios, the available model reduction techniques fail to have a unified approach to obtain a reduced order (or reduced dimension) models of the airflow in a room covering all the above scenarios, i.e., parametric uncertainties as well as boundaries conditions uncertainties.

Some embodiments of the invention are based on a realization that the problem of representing a complex model of a system with a simpler model of the system can be transformed into a virtual control problem of controlling the system of the simpler model to track a reference trajectory of the performance measurements determined using the complex model of the system. In this virtual control problem, the control inputs include the coefficients of the simpler model, and the output of the virtual control is performance measurement determined for the system according to the simpler model with input coefficients.

For example, reducing the PDE model to the ODE model can be seen as a virtual control problem where the controlled output is the ODE solution over a given time interval, the reference time-varying output trajectory is the solution of the PDE model, and the control signals are the coefficients of the ODE model.

The solution to the virtual control problem is the control inputs, i.e., the coefficients of the simpler model, minimizing a cost function representing the tracking error. This realization allows using model free control optimization methods to virtually control the virtual control problem to determine the coefficients of the simpler model.

For example, in one embodiment of the invention a reduced order model (ROM) has the quadratic form $$\dot{x}_r = b + Ax_r + x_r^T B x_r,$$

where b, A, B are constants related to the constants of the PDE equation and to the type of model reduction algorithm used, and $x_r$ is of a reduced dimension r and represents the vector of the reduced order states. The original states of the system x can be recovered from $x_r$ using the following simple algebraic equation $$x(t) \approx \Phi x_r(t),$$

where x is usually a vector of high dimension n>>r, containing the room airflow and room temperature at n desired points or locations of the room, obtained from the spatial discretization of the PDE equation, and Φ is a matrix formed by concatenating given vectors called modes or basis vectors of the ROM. These modes differ depending on which model reduction method is used. For example, proper orthogonal decomposition (POD) can be used or dynamic mode decomposition (DMD) method etc.

However, the solution of the ROM model can lead to unstable solution (divergent over a finite time support) which is not reproducing the physics of the original PDE models having a viscous term that makes the solutions always stable, i.e. bounded over a bounded time support.

Accordingly, some embodiments modifies the reduce order model by adding a stability parameter representing a difference between the reduced order model and the physical model. The stability parameter ensures the stability of the simplified model used by some embodiments of the invention and allows updating only the stability parameter in response to detecting the error between values of the airflow determined according to the model and values of the airflow measured during the operation, which simplify the updating 170.

Accordingly, in some embodiments of the invention, the model 110 of the airflow dynamic is $$\dot{x}_r = b + Ax_r + x_r^T B x_r + F(K,x),$$

where F is an extra term, i.e., the stability parameter, added to stabilize the solutions of the ROM model. This term can be linear or nonlinear function of its arguments. The term K represents a vector of coefficients that should be tuned to ensure the stability as well as the fact that the ROM needs to reproduce the dynamics or solutions of the original PDE model.

In some embodiments, the mapping F is $$F(K,x) = K(t,x_m)x,$$

wherein K is a vector of stability coefficients ensuring a stability of the model of the airflow dynamics. The coefficients of the vector K can be optimized using an iterative optimization-based tuning.

Figure 2:
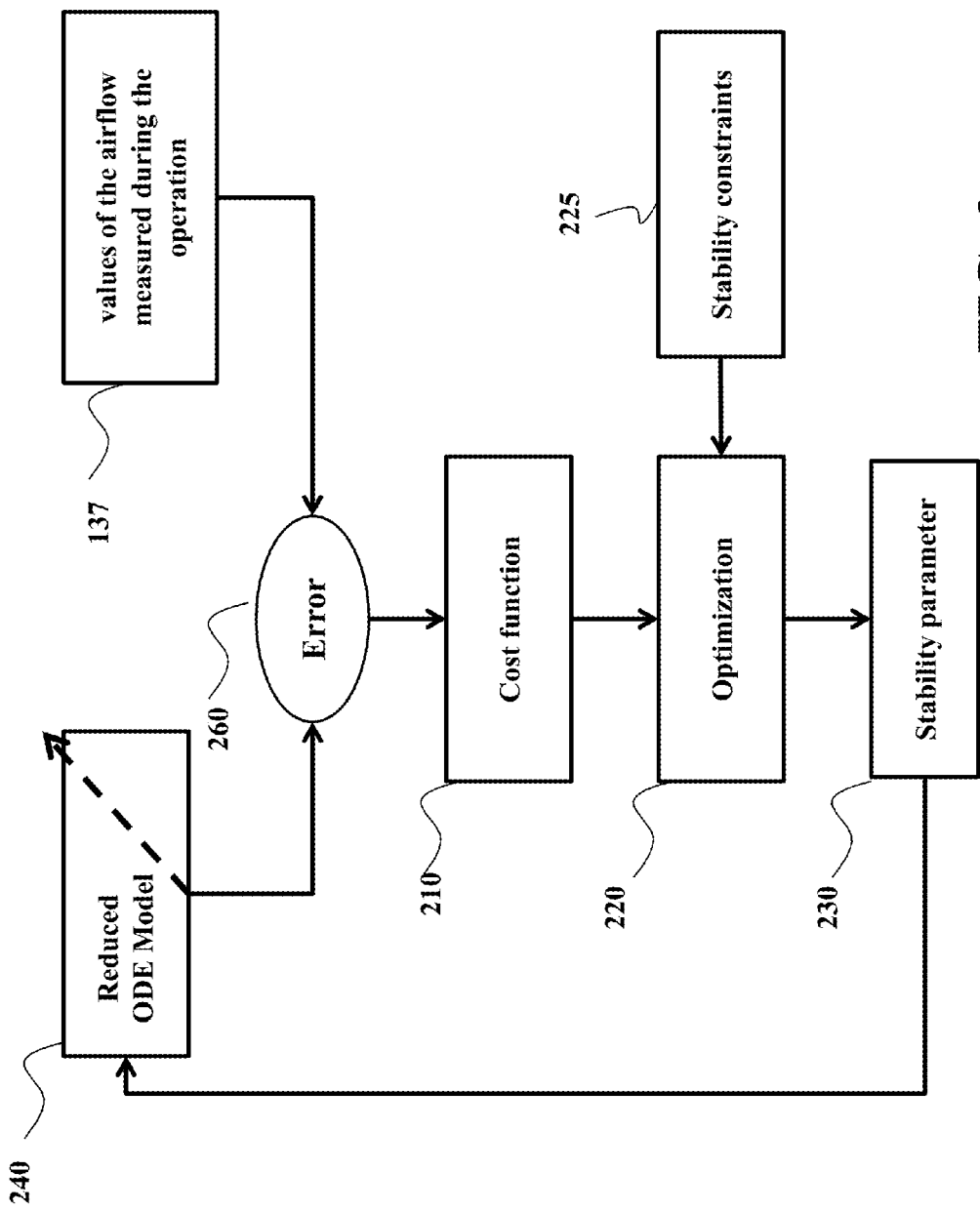
FIG. 2 is a block diagram a model reduction method according to some embodiments of the invention.

FIG. 2 shows a block diagram a model reduction method according to some embodiments of the invention. For example, one embodiment updates the simplified order model 240 modified with a stability parameter by optimizing 220 a cost function 210 of the error 260 between values of the airflow determined according to the model and values of the airflow measured during the operation subject to stability constraints 225.

For example, in one embodiment the optimization 220 includes minimizing a cost function 210 of the error subject to stability constraints 225 according to $$\text{Min}_{K(t)} Q(e)$$

$$K(t) \in \text{Stability constraints,}$$

wherein the error includes $$e = x(t) - x_m(t),$$

wherein x(t) are the values of the airflow determined according to the model at a time t, and $x_m(t)$ are the values of the airflow measured during the operation at the time t.

The cost function includes $$Q(e) = \int_{t_0}^{t_f} e(t)^T W e(t) dt, \quad W > 0,$$

wherein W is a positive definite weight matrix, and $t_0$, $t_f$ are an initial value and a final value of a given time interval of the operation, and T is a transpose operator.

In some embodiments, the updating 170 includes the update of only the stability parameter 230 and/or the vector of stability coefficients subject to stability constraints. For example, the stability constraints for the vector of stability coefficients are $$K \in \{K \in R^r, s.t. \text{ eig}(\tilde{A}) < 0\}.$$

wherein eig(.) stands for eigenvalues of the matrix (.), and the matrix $\tilde{A}$ is $$\tilde{A} = A + x_m(t)^T (B^T + B) - K(t).$$

In some embodiments, the optimization 220 of the cost function is performed on-line during the operation of the air-conditioning system. For example, one embodiment optimizes the cost function using a gradient descent with numerical evaluation of the gradient of the cost function. Other embodiments use different existing nonlinear programming methods to solve the optimization problem online 220. The solution of the optimization problem leads to optimal coefficients 230, which is used to update the ROM 240 by updating the function F as described above.

Some embodiments of the invention determine the error between a subset of states of the airflow measured by a set of sensors placed in an environment conditioned by the air-conditioning system and a corresponding subset of states of the airflow determined using the model. In this case the cost function 210 is only function of the error 260 between the measured components of x and the corresponding components of the ROM solution vector.

Figure 3:
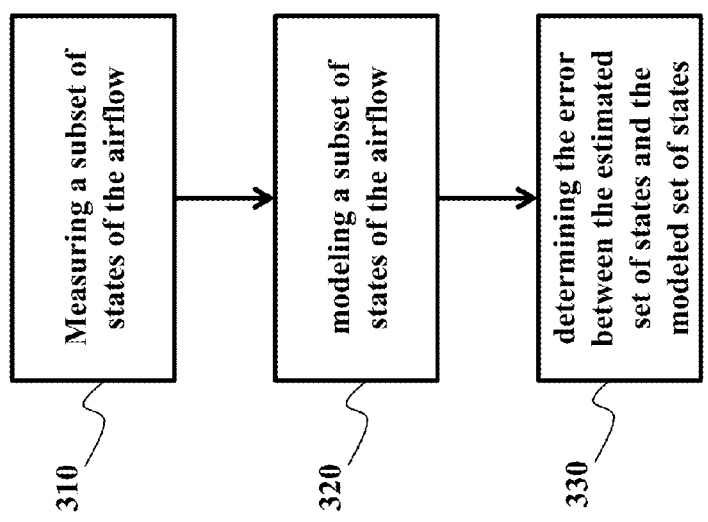
FIG. 3 is a block diagram of a method for determining the error based on more complete set of states of the airflow according to one embodiment of the invention.

FIG. 3 shows a block diagram of a method for determining the error 260 based on more subset of states of the airflow according to one embodiment of the invention. The embodiment determines 310 a subset of states of the airflow measured by a set of sensors placed in an environment conditioned by the air-conditioning system. The embodiment models 320 the airflow using the model to produce a modeled subset of states of the airflow corresponding to the subset of measured states and determines 340 the error between the measured subset of states and the modeled subset of states.

Figure 4:
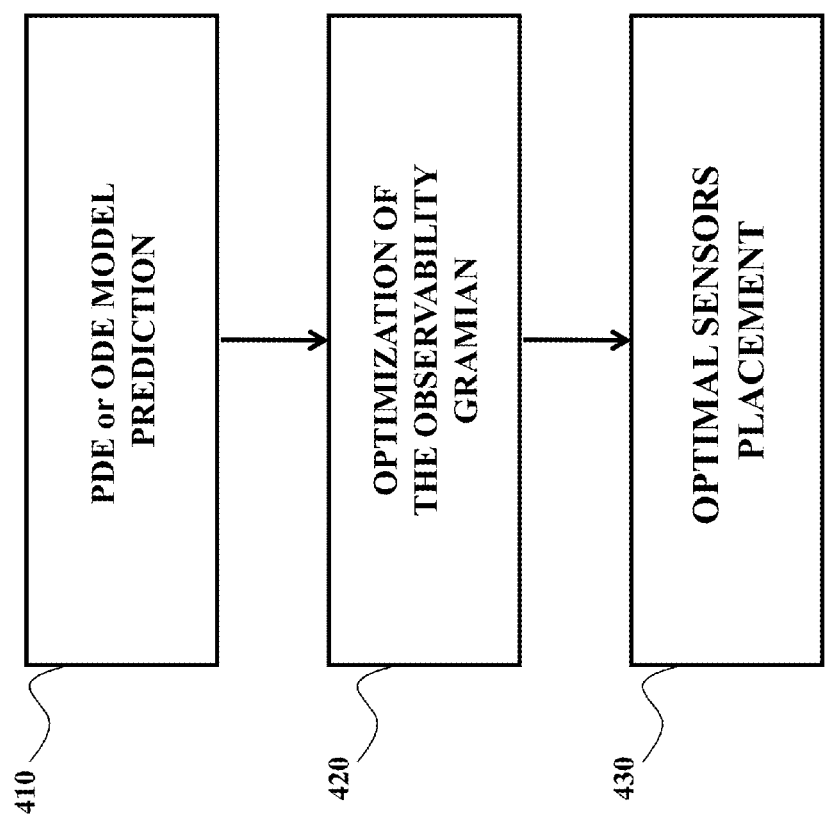
FIG. 4 is a schematic of a method for determining placements of the sensors in the conditioned environment, such as the room, according to some embodiment of the invention.

FIG. 4 shows a schematic of a method for determining placements of the sensors in the conditioned environment, such as the room 160, according to some embodiment of the invention. These embodiments are based on recognition that it is unrealistic to measure all the components of the vector x of the temperature and flow of the air in the room. Accordingly, these embodiments arrange the placement 430 of the sensors optimally to maximize 420 an observability gramian of the ODE or the PDE 410.

Figure 5:
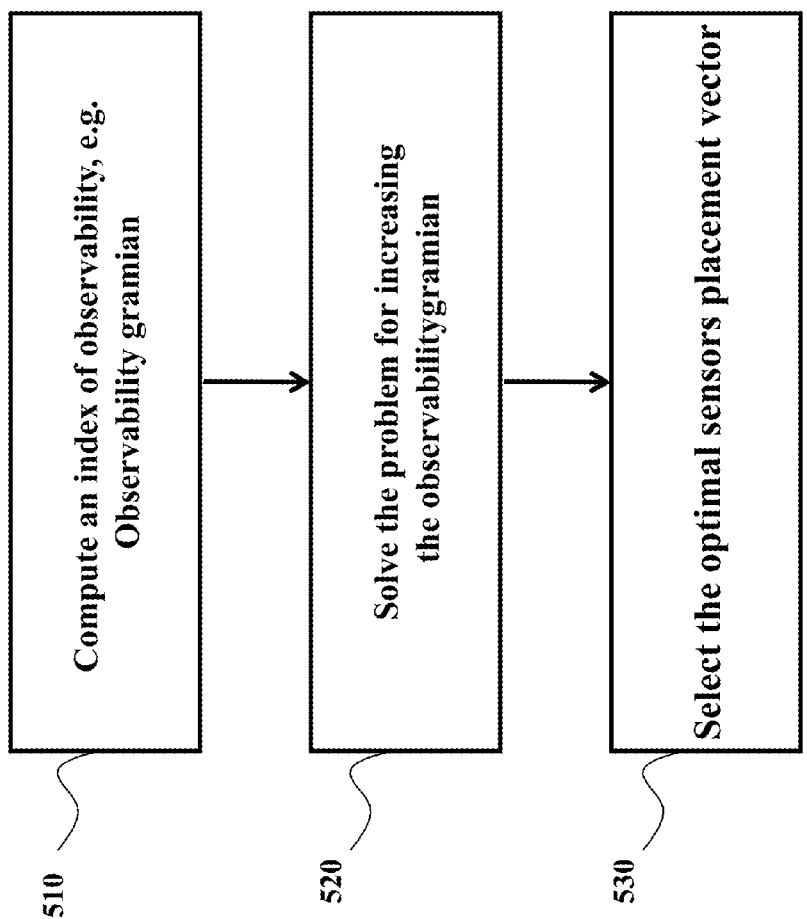
FIG. 5 is a block diagram of a method for optimization observability gramian according to one embodiment.

FIG. 5 shows a block diagram of a method for optimization observability gramian according to one embodiment of the invention. The embodiment selects a desired observability index 510. For example, the embodiment selects the observability index as an observability gramian, which is the rank of the observability matrix, defined as a function of the system PDE or ODE model's coefficients. Then, the observability gramian is increased 520, e.g., maximized with respect to the position vector of the sensors. The solution of this maximization problem gives the optimal selection of the sensors positions 530

Some embodiments of the invention are based on a recognition that the operation of the air-conditioning system under different conditions can result in different regimes of the fluid dynamics. In the controlled environments considered herein, the geometry, boundary conditions and external disturbances can change over time. Therefore, the control of the air-conditioning system in such environments has to adapt to those changes during runtime.

For example, if the room doors and windows are closed, the airflow inside of the room has certain flow patterns, and dynamics; if one of the windows is opened, then the airflow has different flow patterns and dynamics. A collection of one or more operating conditions yielding similar flow patterns and dynamics is referred herein as a regime. Some embodiments of the invention are based on recognition that the low dimensional models with lower complexity can be derived using various low dimensional techniques, such as Galerkin projection. This projection results in the same ROM for all regimes of the fluid dynamics, which is suboptimal.

Accordingly, some embodiments determine the regime of the fluid dynamic at a given time during the operation and select a model of the fluid dynamic for that regime. Such a selection is advantageous, because different regimes can be represented with different ROM and/or corresponding parameters of the ROM.

Figure 6A:
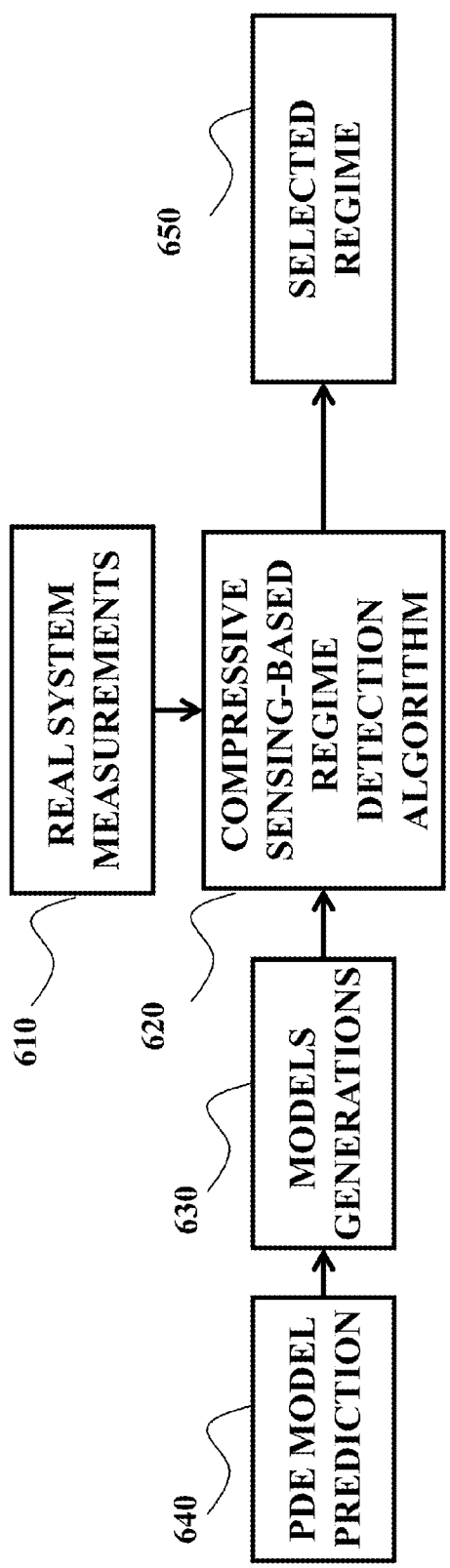
FIG. 6A is a block diagram of a method for selecting a regime of the airflow for controlling the air-conditioning system according to one embodiment.

FIG. 6A shows a block diagram of a method for selecting a regime of the airflow or any other movement of the fluid for controlling the air-conditioning system according to one embodiment. The method generates the possible ROMs 630 of the physical model 640 for different regimes, and then compares the models for different regimes to the models reconstructed from the values 610 of the airflow and temperature measured during the operation. For example, the real-time model reconstruction can be done using a compressive sensing 620. Finally, the method selects the ROM associated with dominant regime of the operation.

In one embodiment the measurements $x_m$ are used to solve the following compressive sensing problem $$\text{Min}_{x_r} \|x_r\|_1$$

$$\|x_m - \Phi x_r\|_2 \leq \text{tol},$$

where tol is a desired tolerance value.

Here, we underline that the matrix $\Phi$ is obtained by concatenating all possible modes generated 630 from all possible regimes predicted by the PDE model 640. In this case, when the above compressive sensing problem is solved 620, the amplitude of the vector $x_r$ components indicate prominent regime at the time where the measurements are done. For example, if the first three elements of the vector $x_r$ are much larger than the other elements, then the three first modes are the dominant modes and the associated regime is then selected 650 to be the prominent regime. In other embodiments other norms can be used in the definition of the compressive sensing optimization problem, e.g., 1p-norm p>1.

Figure 6B:
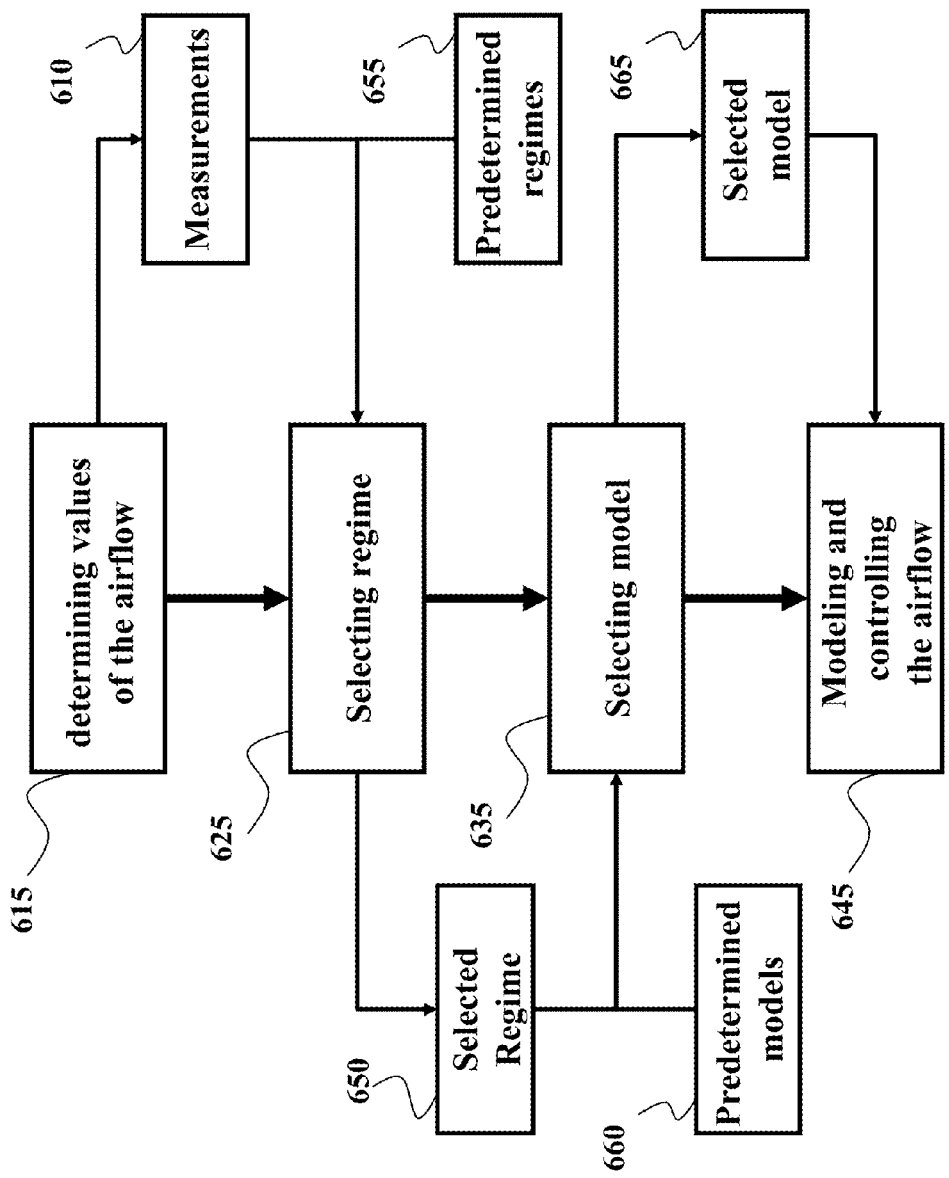
FIG. 6B is a block diagram of a method for controlling an operation of an air-conditioning system according to another embodiment of the invention.

FIG. 6B shows a block diagram of a method for controlling an operation of an air-conditioning system generating airflow in a conditioned environment according another embodiment of the invention. The embodiment determines 615 values 610 of the airflow measured in the conditioned environment during the operation of the air-conditioning system, and selects 625, from a set of regimes 655 predetermined for the conditioned environment, a regime 650 of the airflow matching the measured values of the airflow.

The set of regimes 655 and corresponding set of models 660 can be predetermined offline using various simulation and dimensionality reduction techniques and stored in a memory, e.g., operatively connected to the processor of the controller 120. Such an offline determination of the set of regimes 655 and the corresponding set of models 660 of the airflow, allows the embodiment to select 635 the model 665 during the operation of the air-conditioning system that correspond to the current regime of dynamics of the airflow. Such a selection is advantageous, because different regimes can be represented with different reduced order models (ROM) and/or corresponding parameters of the ROM. Next, the embodiment models 645 the airflow using the selected model and controls the operation of the air-conditioning system using the modeled airflow.

Some embodiments of the invention are based on recognition that the regimes of the airflow can be represented by the dominant structures and their time evolution, i.e. fluid dynamics. The dominant structures of the airflow indicate constraints on the movement of the air and its temperature distribution in the controlled environment. These constraints therefore define a pattern of the movement of the air that satisfies the constraints. To that end, the dominant structures of the airflow are analogous to currents in the ocean where different forces can generate a continuous, directed movement of seawater. Similar to the currents in the ocean forming identifiable patterns, the dominant structures corresponding to a regime form a pattern in the controlled environment that can serve as a fingerprint identity of the regime.

FIGS. 8A, 8B, 8C and 8D show patterns 810, 820, 830 and 840 forming dominant structures of the airflow for different regimes arising from different configurations and boundary conditions in the control environment. The set of regimes of the airflow can be determined by parametrizing these patterns of the airflow.

In one embodiment, the airflow velocity and temperature field is defined as value of 3D velocity vector and 1D temperature vector at discrete points in the controlled environment. At any time, airflow velocity and temperature field can be described as combination of temperature and velocities of the dominating structures of airflow. The strength of these dominant structures, measured by some norm, is not usually static in time. Information about the time evolution (i.e. the dynamics) of the dominant structures can also be used to form addition constraints during the regime selection process reducing the dependency to sensor noise.

Accordingly, in some embodiments, the values of the airflow include velocity and temperature measurements of the airflow at a set of locations in the conditioned environment, and the regime is selected by comparing a function of the values of the airflow against constraints representing a structure of each predetermined regime. For example, one embodiment, using the measured values, at least partial information of a pattern, e.g., the pattern 810, 820, 830 or 840, of the movement of the airflow in the controlled environment, compares the partial information with corresponding values of patterns of each regime to select the best regime matching the measured values of the airflow.

Some embodiments are based on realization that if only the dominant structures are used to represent the airflow, such a representation makes the airflow sparse in the set of all possible flow patterns in the controlled environment. These recognitions lead to a realization that the combination of the sparsity of the signal representing dominant structures of the airflow and limited range of possible values of the dominant structures of the airflow enable reconstruction of the dominant structures of the actual airflow using various compressive sensing techniques, which are used to recover a signal sampled at a sampling rate below its Nyquist sampling rate.

Figure 7:
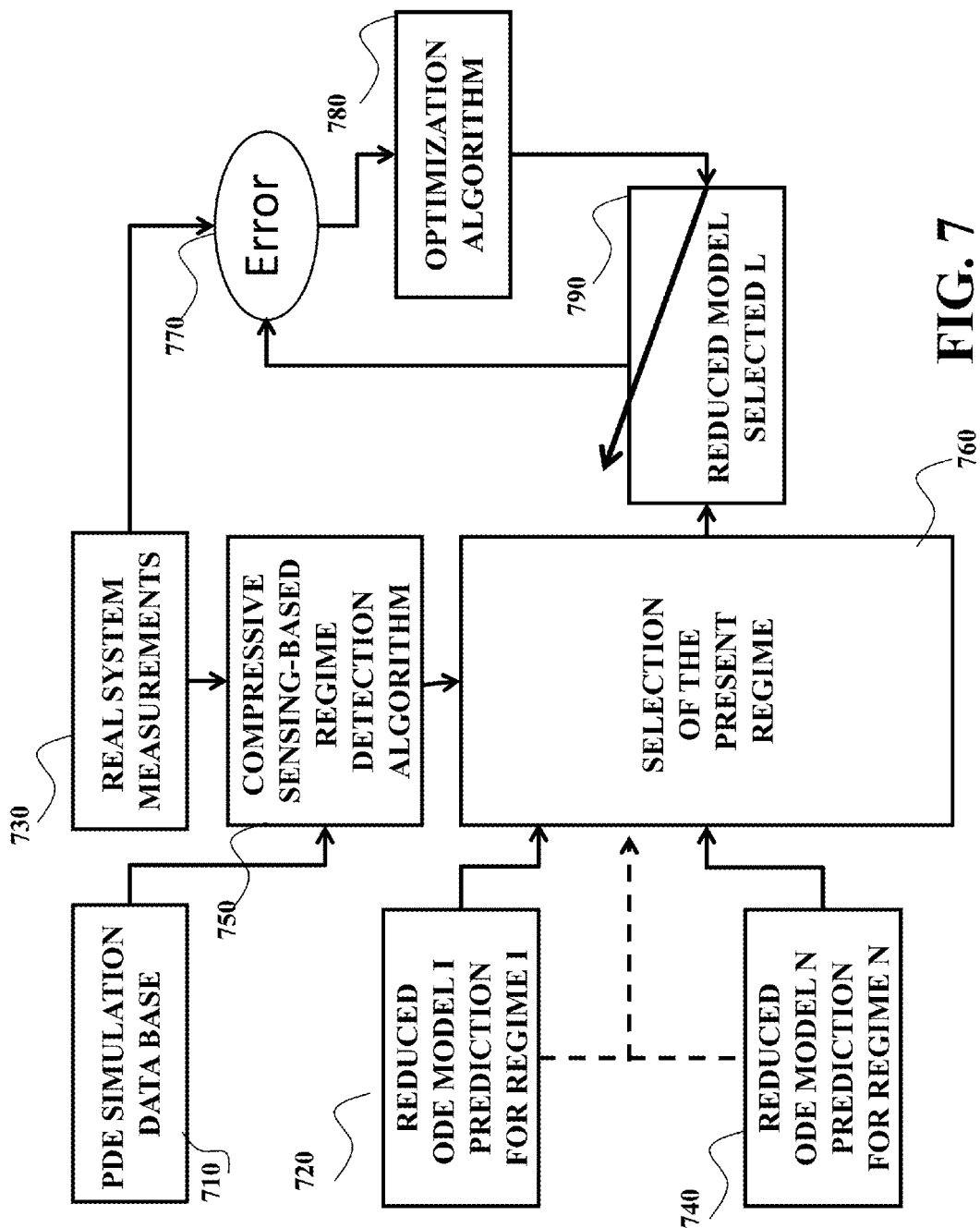
FIG. 7 is a block diagram of a method for selecting ROM for the current regime according to one embodiment of the invention.
Figure 8:
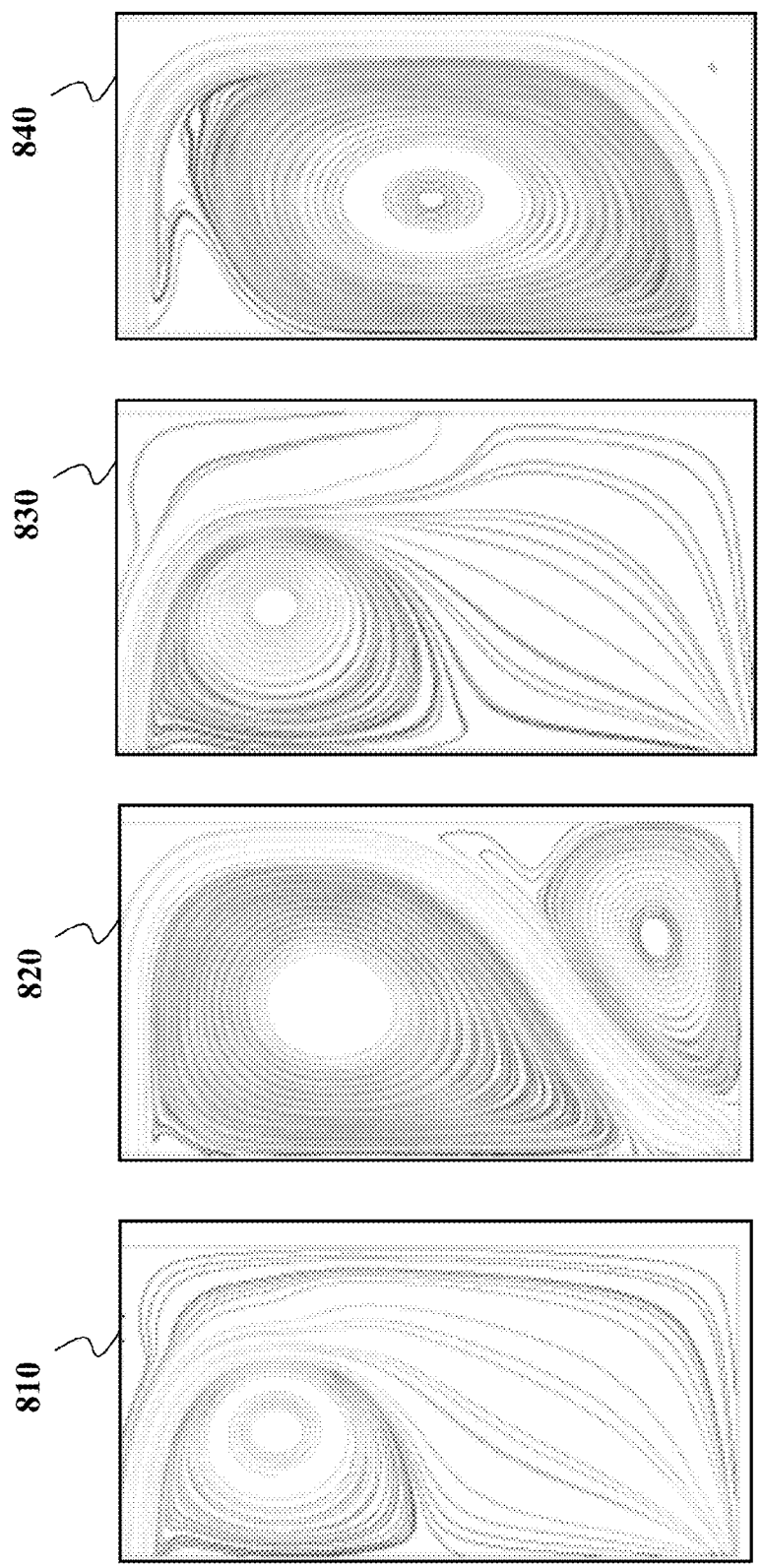
FIGS. 8A, 8B, 8C and 8D are exemplar patterns forming dominant structures of the airflow for different regimes arising from different configurations and boundary conditions in the control environment.

FIG. 7 shows a block diagram of a method for selecting model for the current regime according to one embodiment of the invention. The PDE simulation database 710 is used together with real measurements of the flow and temperature 730 to be fed to a compressive sensing algorithm 750 to detect the present regime 760. This embodiment compares the measured values of the airflow with patterns of each regime using a compressed sensing to select the regime best matching the measured values of the airflow and then selects the associated model, e.g., the model 720 or 740.

Optionally, the virtual tracking is further used to update the parameters of the selected model. For example, the selected model is further solved to estimate the values of the airflow, and the estimated values are compared 770 to the measured values 730 of the airflow. The obtained error 770 is submitted to an optimization algorithm 780 to optimize some coefficients of the model 790 and improve the determination of the modeled airflow and temperature.

Determining Dominant Structures

Some embodiments of the invention are based on recognition that the regimes of the airflow can be represented by the dominant structures and their time evolution, i.e. dynamics. Such structures can be determined by various feature extraction techniques, such as proper orthogonal decomposition (POD) or dynamic mode decomposition (DMD) and can serve as identifiers for the regimes. In some embodiments, the each regime in the set of regimes of the airflow is represented as a block of basis elements determined using, e.g., the POD and/or DMD methods.

Proper Orthogonal Decomposition

Given a dynamical system of the form $$\dot{x}(t) = F(t, x(t)), t > 0 \quad (1)$$

$$x(0) = x_0, \quad (2)$$

with solutions $x(t_k) = x_k$, where $F: {}^n \mapsto {}^n$ is a (generally) nonlinear function, and t denotes the independent time variable. The POD finds the basis that best represents the data in the $L_2$ sense, and solves the optimization problem $$\min_{\phi_i} \sum_{j=1}^{s} \left\| x_j - \sum_{i=1}^{r} (x_j, \phi_i) \phi_i \right\|_2^2 \quad \text{s.t.} \quad (\phi_i, \phi_j) = \delta_{ij}. \quad (3)$$

To generate the POD basis, some embodiments collect snapshots (experimental or from simulations) of the solution at times $t_i$, $i = 1, \ldots, n_s$ and store the values in a matrix $$X := [x(t_0), x(t_1), \ldots, x(t_{n_s})].$$

One embodiments solves the optimization problem (3) via Lagrange multipliers, which reveals that the modes are computed from the eigenvalue decomposition $$XX^T \Phi_i = \lambda_i \Phi_i, \quad (4)$$

where $XX^T$ is the correlation matrix. The functions $\varphi_i$ are POD basis functions representing modes or models of the POD. The $\lambda_i$ are the eigenvalues of the POD.

Dynamic Mode Decomposition

Let $$X_0 := [x(t_0), x(t_1), \ldots, x(t_{n_s-1})] \text{ and } X_1 := [x(t_1), x(t_2), \ldots, x(t_{n_s})]$$

be matrices of snapshots of the dynamical system (1)-(2). Note, that the matrix $X_1$ can be thought of advancing $X_0$ by one time step. The DMD uses the assumption that there is a linear, infinite dimensional forward operator A (known as Koopman operator in ergodic theory), such that $$X_1 = AX_0. \quad (5)$$

Because the data representing the airflow is finite dimensional, the operator can be represented as a matrix and the DMD approximates the eigenvalues of operator A, from the data $X_0$, $X_1$ only to represent the dynamics of the airflow.

Some embodiments determine the singular value decomposition of $X_0 = W \Sigma V^T$ to eliminatenear rank deficiency. Then, $$X_0 \approx X_{0,r} = W_r \Sigma_r V_r^T,$$

where the matrices are truncated accordingly. Because $\|X_0 - X_{0,r}\|_2 = \sigma_{r+1}$, so if the singular values decay rapidly, the truncation error is small. Therefore $$X_1 \approx AW_r \Sigma_r V_r^T \Rightarrow S_r := W_r^T X_1 V_r \Sigma_r^{-1} \approx W_r^T AW_r, \quad (6)$$

by orthogonality of $V_r$. Next, take the eigenvalue decomposition $$S_r = Y \Lambda Y^{-1},$$

and assume that $W_r W_r^T \approx I_r$, which yields $$Y \Lambda Y^{-1} \approx W_r^T AW_r \Rightarrow W_r Y \Lambda \approx AW_r Y.$$

Next, let $\Phi = W_r Y$, then $$A\Phi \approx \Phi \Lambda. \quad (7)$$

The computation of the DMD involves a singular value decomposition of (economy) size $n \times n_s$, since $n_s \ll n$, and an eigenvalue decomposition of size $n_s \times n_s$. Note, that the matrix $S_r$ is in general non-symmetric, so that DMD modes can be complex.

In some embodiments, the generation of a sparsity basis for the dynamic regimes is done via POD and DMD. Let $Q = \{q_1, q_2, \ldots, q_d\}$ denote a set of d different configurations (parameters/boundary conditions). For each configuration, some embodiments use simulation data for the Boussinesq (or Navier-Stokes) equations $$x(q_i) \in {}^{N \times n_s}, q_i \in Q,$$

where the snapshots of solutions are on an equidistant time script. Through DMD or POD, the embodiments determine$r_i$ basis functions for every regime, $i = 1, \ldots, d$, which to produce the set of regimes $$\Phi := [\Phi^1 \ldots \Phi^d] \in {}^{N \times R},$$

where $R = \Sigma_{i=1}^{d} r_i$ and for notational convenience $\Phi(d_K) := \Phi^k$.

Regime Selection

Some embodiments of the invention predetermine a set of regimes of flow dynamics, and use the compressed sensing to match flow conditions in the controlled environment to any of the predefined regimes. For example, one embodiment compares the measured values of the airflow with each regime using compressed sensing to select the matching regime according to $$\hat{k} = \arg\min_{k=1,\ldots,d} \|\hat{y} - \Phi^k a(k)\|_2,$$

wherein $\hat{y}$ is the measurements vector, $\Phi^k$ a matrix representing the set of regimes multiplied by an observation matrix, and $\alpha$ is a vector of modal coefficients used to select elements from the set of regimes $\Phi^k$.

Physical or industrial limitations often limit the amount of data available to the sensing mechanism. In particular, for indoor-air environments, the location of sensors can often only be at the boundaries of the domain, e.g. walls or ceilings. Moreover, sensors typically collect local, linear information, therefore motivating the use of point measurements in a mathematical setting. A point measurement matrix C is defined as $$C_{i,j} := \{0, 1\}, \sum_{j=1}^{N} C_{i,j} = 1, \sum_{i=1}^{P} C_{i,j} = 1.$$

In compressed sensing, it is customary to use Gaussian or Bernoulli matrices, since they satisfy the restricted isometry property. However, the practicality of such sensor arrays is rather minimal for flow sensing application. In some embodiments averaged velocities over a small spatial region are sensed producing a sequence of entries in the measuring matrix.

If $x^k$ a sample of the $k^{th}$-regime, the measurements that the system has available for comparing are $$\hat{y} = Cx^k + \eta, \quad (9)$$

wherein $\eta$ is white sensor noise with zero mean. The embodiments select the regime, that best matches the data $\hat{y}$. Therefore, the unknown state is $$x^k = \Phi^k \alpha^k, \alpha^k \in \mathbb{C}^{r_k}.$$

One embodiment defines the matrix $$\Theta^k := C\Phi^k \in \mathbb{C}^{p \times r_k}$$

which includes the rows of the extracted features available to sensing. With this definition, the set of regimes becomes $$\Theta = [\Theta^1 \Theta^2 \ldots \Theta^k]. \quad (10)$$

Consequently, multiplying (9) with $[\Theta^k]^T$ yields $$(\Theta^k)^T \hat{y} = (\Theta^k)^T \Theta^k \alpha^k + (\Theta^k)^T \eta,$$

and $(\Theta^k)^T \Theta^k$ is invertible. Thus, the above equation is rewritten as $$[(\Theta^k)^T \Theta^k]^{-1} (\Theta^k)^T (\hat{y} - \eta) = \alpha^k,$$

$$\Theta^k [(\Theta^k)^T \Theta^k]^{-1} (\Theta^k)^T (\hat{y} - \eta) = y^k,$$

and $y^k = Cx^k$ is the uncorrupted measurement. This procedure defines the natural orthogonal projection onto the space of measurements for the $k^{th}$ regime as $$P_k := \Theta^k [(\Theta^k)^T \Theta^k]^{-1} (\Theta^k)^T.$$

To compare a signal to a subspace, some embodiments consider the norm of the projection to each subspace $\|P_k x\|_2$ and select the maximum. Then, the estimated subspace is given as $$\hat{k} = \arg\max_{k=1,\ldots,d} \|P_k \hat{y}\|_2, \quad (11)$$

which then yields the regime that aligns most with the current, noise corrupted data. Once the best matching regime is selected, the coefficients $\alpha^k$ can be recovered via a least squares solution $$\alpha^k = (\Phi^k)^\dagger \hat{y}.$$

Consider d subspaces $\{\mathcal{W}_k, k=1,\ldots,d\}$ with bases $\{\Phi^1, \Phi^2, \ldots, \Phi^d\}$ and the corresponding projection matrices $\{P_k\}$. A signal approximately lies in a single subspace, k, under the following model:

$$x = x_{in} + x_{out}, x_{in} \in \mathcal{W}_k, x_{out} \perp \mathcal{W}_k,$$

where $x_{in}$ and $x_{out}$ denote the in-subspace and the out-of-subspace components, respectively. For comparison, some embodiments solve the optimization problem (11). To bound the classification performance, let $$\eta := \max_{i \neq j} \|P_i P_j\|_2 = \max_{i \neq j} \frac{\|P_i P_j x\|_2}{\|x\|_2} \quad (12)$$

be a measure of alignment of subspaces. Assume that $\|x_{out}\|_2^2 \leq \in \|x\|_2^2$, with $\in < \frac{1}{2}$ and let $\eta$ be defined as above. Then, if $$\eta < \sqrt{1 - \frac{\varepsilon}{1-\varepsilon}}, \quad (13)$$

the comparison in (11) can be successful. wherein, $P_i$, $P_j$ are the orthogonal projection operators into the i,j regimes, respectively. $\|P\|_2$ is the l2 induced matrix norm, $\eta$ is a coefficient characterizing the distance between i,j regimes, $\in$ is the total signal x to the out-of-subspace signal $x_{out}$ norm ratio.

One embodiment considers other measures for guaranteeing classification performance using the block-sparsity framework. The block-coherence of the library $\Phi$ is defined as $$\eta_B := \max_{j,i \neq j} \frac{1}{r} \sigma([\Phi^i]^* [\Phi^j]), \quad (14)$$

where $r = r_i$, for $i=1,\ldots,d$. Moreover, $\sigma(A)$ denotes the spectral norm, i.e. the largest singular value of A.

Augmented DMD Based Regime Selection

The dynamic mode decomposition is model reduction/feature extraction technique that is based on approximating a linear advance operator, see equation (5). Some embodiments incorporate this linear map into the sensing mechanism. With the concept of an augmented basis, the embodiments can classify batches of consecutive measurements to a single regime. To this end, consider a state vector $x_t = x(t)$, sampled from the underlying dynamical system, and the extracted DMD basis $\Phi_r$ of r basis vectors. The state is expressed in the sparse DMD basis as $$x_t = \Phi_r \beta,$$

where $\beta = \beta(t)$ is the unknown vector of coefficients. According to equation (7), the DMD basis approximates the eigenvectors of the advance operator A. Thus, $A\Phi_r = \Phi_r \Lambda_r$, where $\Lambda_r$ denotes the diagonal matrix of the first r eigenvalues of $\Lambda$.

From the one-step-advance property of the linear operator A, follows that $$x_{t+1} = Ax_t = A\Phi_r \beta = \Phi_r \Lambda_r \beta,$$

and similarly $$x_{t+2} = Ax_{t+1} = A\Phi_r \Lambda_r \beta = \Phi_r \Lambda_r^2 \beta.$$

Iterating over this one-step-advance property results in $X_{t+k} = \Phi_r \Lambda_r^k \beta$, which is incorporated into the sensing mechanism by one embodiment. Therefore, subsequent snapshots can be expressed via the same $\beta$ (and hence the same regime), and to increase the data to improve the comparison.

In particular, the above information can be represented as $$\begin{bmatrix} x_t \\ x_{t+1} \\ \vdots \\ x_{t+k} \end{bmatrix} = \begin{bmatrix} \Phi_r \beta \\ \Phi_r \Lambda_r \beta \\ \cdots \\ \Phi_r \Lambda_r^k \beta \end{bmatrix} = \begin{bmatrix} \phi_1 & \phi_2 & \cdots & \phi_r \\ \lambda_1 \phi_1 & \lambda_2 \phi_2 & \cdots & \lambda_r \phi_r \\ \vdots & \vdots & & \vdots \\ \lambda_1^k \phi_1 & \lambda_2^k \phi_2 & \cdots & \lambda_r^k \phi_r \end{bmatrix} \cdot \beta$$

Next, define the augmented DMD basis as $$\hat{\phi}_i^k := \begin{bmatrix} \phi_i \\ \lambda_i \phi_i \\ \vdots \\ \lambda_i^k \phi_i \end{bmatrix} \in \mathbb{C}^{kN}, \text{ with } \hat{\phi}_i^0 := \phi_i,$$

so that the previous equation can be rewritten as $$\underbrace{\begin{bmatrix} x_t \\ x_{t+1} \\ \vdots \\ x_{t+k} \end{bmatrix}}_{x_t^{t+j}} = \underbrace{[\hat{\phi}_i \hat{\phi}_i^1 \cdots \hat{\phi}_i^k]}_{\hat{\Phi}} \cdot \beta.$$

By considering the outputs of the dynamical system, $y_t = Cx_t$, the recursion remains unchanged. To this end, let a sensing matrix $C \in {}^{p \times r}$ be given, and define a block diagonal sensing matrix $\mathcal{C} = \text{blkdiag}(C, \ldots, C)$ having k copies of C on its diagonal. Similarly, we define $y_t^{t+j} = Cx_t^{t+j} \in {}^{pj}$. Recall, that the derivation is for a single dynamic regime say i, so to be precise with notation, $\hat{\Phi} = \hat{\Phi}^i$ so that we have $$y_t^{t+j} = \mathcal{C} \hat{\Phi}^i \beta.$$

Figure 9:
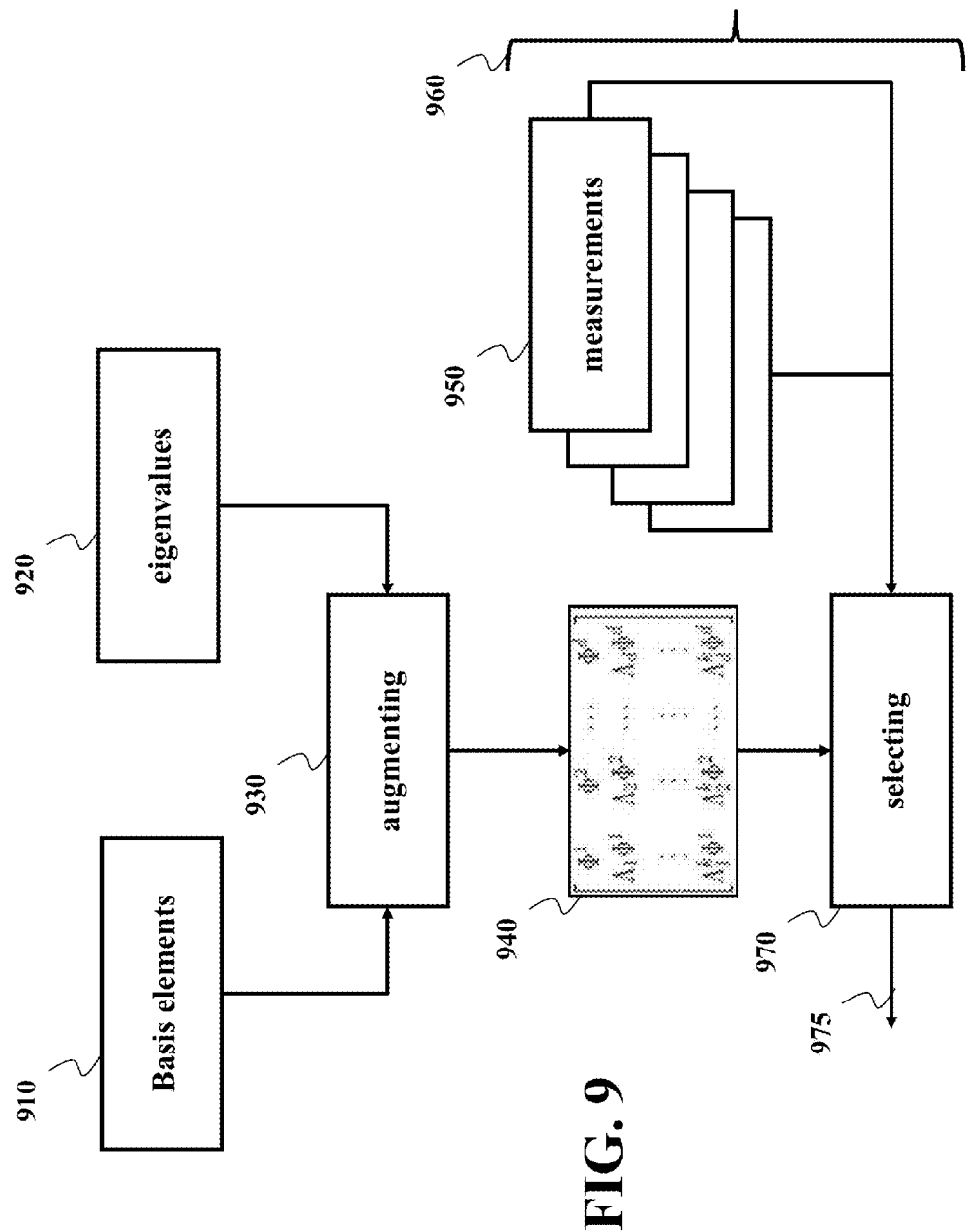
FIG. 9 is a block diagram of a method for selecting the regime of the fluid dynamics iteratively according to one embodiment of the invention

FIG. 9 shows a block diagram of a method for selecting 970 the regime 975 of the fluid dynamics according to one embodiment of the invention. In this embodiment the blocks of basis elements 910 are augmented 930 with time evolution of the basis elements based on eigenvalues 920. For example, the blocks of basis elements include approximation of Koopman eigenmodes determined as eigenvectors of a DMD.

For example, when the DMD modes $\Phi^i = \Phi_r(q_i)$ and eigenvalues $\Lambda_i = \Lambda_r(q_i)$ of each dynamic regime i are computed, the augmented DMD 940 is $$\hat{\Phi} := \begin{bmatrix} \Phi^1 & \Phi^2 & \cdots & \Phi^d \\ \Lambda_1 \Phi^1 & \Lambda_2 \Phi^2 & \cdots & \Lambda_d \Phi^d \\ \vdots & \vdots & \vdots & \vdots \\ \Lambda_1^k \Phi^1 & \Lambda_2^k \Phi^2 & \cdots & \Lambda_d^k \Phi^d \end{bmatrix}. \quad (15)$$

Accordingly, some embodiments define $\beta := [\beta^*(q_1) \beta^*(q_2) \ldots \beta^*(q_d)]^*$ as the corresponding augmented block-sparse vector. The problem of regime selection becomes $$\hat{i} = \arg\min_{i=1,\ldots,d} \|y_t^{t+j} - \mathcal{C} \hat{\Phi}^i \beta\|_2, \quad (16)$$

wherein $\beta \in \mathbb{C}^R$ is 1-block-sparse and $y_t^{t+j} \in {}^{pj}$ is the available data. Therefore, the augmented selection problem incorporates more system data over time, i.e., dynamics, with the same number of sensors arranged at the same spatial locations for recording time evolution data.

To that end, the embodiment select 970 the regime 975 iteratively 960 using the values 950 of the airflow measured at multiple instances of time by comparing the augmented basis elements 940 with the values 950 of the airflow changing over the multiple instances of time.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of an air-conditioning system generating airflow in a conditioned environment, comprising:
   determining values of the airflow measured in the conditioned environment during the operation of the air-conditioning system, wherein the air-conditioning system includes operatively controllable components;
   selecting, from a set of regimes predetermined for the conditioned environment, a regime of the airflow matching the measured values of the airflow;
   wherein the values of the airflow include velocity and temperature measurements of the airflow at a set of locations in the conditioned environment, and wherein the selecting the regime comprises: comparing a function of the values of the airflow against constraints representing a structure of each predetermined regime;
   selecting, from a set of models of the airflow predetermined for the conditioned environment, a model of airflow corresponding to the selected regime;
   modeling the airflow using the selected model; and
   controlling the operation of the air-conditioning system using the modeled airflow by controllably changing a state of at least one component, wherein steps of the method are performed using at least one processor of a controller.

2. The method of claim 1, further comprising: determining, using the measured values, partial information of a pattern of movement of the airflow in the controlled environment; and comparing the partial information with corresponding values of patterns of each regime to select the best regime matching the measured values of the airflow.

3. The method of claim 1, further comprising:
   comparing the measured values of the airflow with patterns of each regime using a compressed sensing to select the regime best matching the measured values of the airflow.

4. The method of claim 1, further comprising:
   determining a set of regimes of the airflow by parametrizing patterns of the airflow arising from different configurations and boundary conditions in the control environment; and
   comparing the measured values of the airflow with each regime using a compressed sensing to select the matching regime.

5. The method of claim 1, wherein each regime in the set of regimes of the airflow is represented as a block of basis elements; and
   comparing the measured values of the airflow with each regime using compressed sensing to select the matching regime according to $$\hat{k} = \arg\min_{k=1,\ldots,d} \|\hat{y} - \Phi^k a\|_2,$$

wherein $\hat{y}$ is a vector of the measured values, $\Phi^k$ a matrix representing the set of regimes, and $\alpha$ is a vector of modal coefficients for selecting elements from the set of regimes $\Phi^k$.

6. The method of claim 5, wherein the blocks of basis elements include approximation of Koopman eigenmodes determined as eigenvectors of a dynamic mode decomposition (DMD).

7. The method of claim 5, wherein the blocks of basis elements are augmented with time evolution of the basis elements based on eigenvalues of a dynamic mode decomposition (DMD) representing dynamics of the basis elements.

8. The method of claim 7, further comprising:
   selecting the regime iteratively using the values of the airflow measured at multiple instances of time by comparing the augmented basis elements with the values of the airflow changing over the multiple instances of time.

9. The method of claim 1, wherein the controlling comprises:
   changing a state of at least one component of the air-conditioning system by the controller connected to at least one control device, the controller transforms at least one control signal into at least one specific control input for at least one corresponding component.

10. The method of claim 1, wherein the controlling comprises:
    updating at least one control input for at least one component of the air-conditioning system to optimize a metric of performance determined using the model.

11. The method of claim 1, wherein the controlling changes a vent angle of the air-conditioning system.

12. The method of claim 1, further comprising:
    updating the model of airflow connecting values of flow and temperature of the airflow conditioned during the operation of the air-conditioning system, wherein the updating iteratively reduces an error between values of the airflow determined according to the model and the measured values of the airflow.

13. The method of claim 1, wherein the model includes a reduced order model having a number of parameters less than a physical model of the airflow according to a Boussinesq equation, wherein the Boussinesq equation is a partial differential equation (PDE), and wherein the reduced order model is an ordinary differential equation (ODE).

14. The method of claim 13, wherein the model includes a stability parameter representing a difference between the reduced order model and the physical model, and wherein the updating comprises:
    updating only the stability parameter of the model in response to detecting the error.

15. A system for controlling an air-conditioning system generating a flow of fluid in a conditioned environment, comprising:
    a set of sensors for measuring values of the flow in the conditioned environment;
    a memory storing a set of regimes of fluid dynamic in the conditioned environment and a corresponding set of models of flow dynamics connecting values of velocity and temperature of fluid conditioned during the operation of the system, wherein the system includes operatively controllable components;
    a controller for controlling the operation of the system based on a modeled flow, wherein the controller includes a processor for selecting a regime matching the measured values of the flow, for selecting a model corresponding to the selected regime, and for determining the modeled flow using the selected model, wherein the controller controls the operation of the system by controllably changing a state of at least one component of the system, and wherein selecting the regime comprises: comparing a function of the values of the airflow against constraints representing a structure of each predetermined regime.

16. The system of claim 15, wherein the air-conditioning system generates the flow of air in the conditioned environment, and wherein some components of the air-conditioning system comprises:
- an evaporator having a fan for adjusting an air-flow rate through a heat exchanger;
- a condenser having a fan for adjusting the air-flow rate through the heat exchanger;
- a compressor having a speed for compressing and pumping refrigerant through the system; and
- an expansion valve for providing an adjustable pressure drop between a high-pressure portion and a low-pressure portion of the vapor compression system.

17. The system of claim 15, wherein each model includes a reduced order model having a number of parameters less than a physical model of the airflow and a stability parameter representing a difference between the reduced order model and the physical model, and wherein the processor updates the stability parameter of the selected model in response to detecting an error an error between values of the flow determined according to the selected model and the values of the flow measured during the operation.

18. An air-conditioning system, comprising:
- a user input interface for receiving a setpoint;
- a set of sensors for measuring values of airflow in the conditioned environment;
- a set of operatively controllable components including an evaporator having a fan for adjusting an airflow rate through a heat exchanger;
- a condenser having a fan for adjusting the airflow rate through the heat exchanger; a compressor having a speed for compressing and pumping refrigerant through the system; and
- an expansion valve for providing an adjustable pressure drop between a high-pressure portion and a low-pressure portion of the vapor compression system;
- a memory storing a set of regimes of fluid dynamic in the conditioned environment and a corresponding set of models of flow dynamics connecting values of velocity and temperature of the airflow conditioned during the operation of the system; and
- a controller for controlling the operation based on a modeled airflow to achieve the setpoint, wherein the controller includes a processor for selecting a regime matching the measured values of the airflow, for selecting a model corresponding to the selected regime, and for determining the modeled flow using the selected model, wherein the controller controls the operation of the system by controllably changing a state of at least one component of the system, and wherein selecting the regime comprises: comparing a function of the values of the airflow against constraints representing a structure of each predetermined regime.

19. The system of claim 18, wherein the model includes a reduced order model having a number of parameters less than a physical model of the airflow, and a stability parameter representing a difference between the reduced order model and the physical model, and wherein the processor updating only the stability parameter of the model in response to detecting an error between values of the airflow determined according to the selected model and the values of the airflow measured during the operation.

20. A method for controlling an operation of an air-conditioning system generating airflow in a conditioned environment, comprising:
- determining values of the airflow measured in the conditioned environment during the operation of the air-conditioning system;
- selecting, from a set of regimes predetermined for the conditioned environment, a regime of the airflow matching the measured values of the airflow, wherein each regime in the set of regimes of the airflow is represented as a block of basis elements, such that the selecting compares the measured values of the airflow with each block of basis elements representing each regime in the set of regimes and selects the best matching regime;
- selecting, from a set of models of the airflow predetermined for the conditioned environment, a model of airflow corresponding to the selected regime;
- modeling the airflow using the selected model; and
- controlling the operation of the air-conditioning system using the modeled airflow by controllably changing a state of at least one component, wherein steps of the method are performed using at least one processor of a controller.

* * * * *